United States Patent
Hsieh

(10) Patent No.: US 6,864,942 B2
(45) Date of Patent: Mar. 8, 2005

(54) LIQUID CRYSTAL DISPLAY PANEL

(75) Inventor: Chen-Hsun Hsieh, Pingtung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 10/604,326

(22) Filed: Jul. 11, 2003

(65) Prior Publication Data

US 2004/0179163 A1 Sep. 16, 2004

(30) Foreign Application Priority Data

Mar. 10, 2003 (TW) .......................... 92105114 A

(51) Int. Cl.$^7$ .......................... G02F 1/1345
(52) U.S. Cl. .......................... 349/151; 349/150
(58) Field of Search .......................... 349/139, 149, 349/150, 151, 152; 345/206

(56) References Cited

U.S. PATENT DOCUMENTS 6,518,557 B1 * 2/2003 Izumi et al. .............. 250/208.1

2001/0050688 A1 * 12/2001 Fujiyoshi et al. ........... 345/600

* cited by examiner

Primary Examiner—Toan Ton
Assistant Examiner—Tai Duong
(74) Attorney, Agent, or Firm—Jianq Chyun IP Office

(57) ABSTRACT

A liquid crystal display panel is provided. The liquid crystal display panel comprises a first substrate, a second substrate, a liquid crystal layer and a plurality of driver chips. The first substrate has an array area and a pair of non-display areas opposite positioned on each side of the array area. The two non-display areas furthermore comprise a plurality of driver chip bonding areas for accommodating the driver chips. The second substrate is positioned over the array area. The liquid crystal layer is formed between the first substrate and the second substrate. The driver chips are positioned on the respective driver chip bonding areas for driving the liquid crystal layer between the first substrate and the second substrate. In addition, the two non-display areas furthermore have a plurality of flexible printed circuit film areas for connecting with flexible printed circuit films.

7 Claims, 3 Drawing Sheets

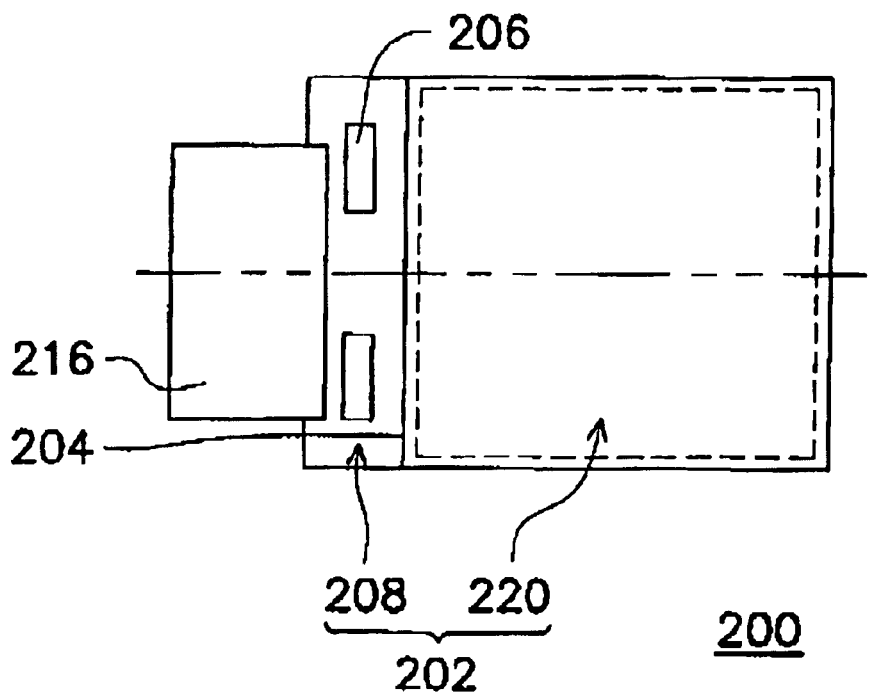
FIG. 2A(PRIOR ART)
Replacement Sheet

LIQUID CRYSTAL DISPLAY PANEL

CROSS REFERENCE TO RELATED APPLICATIONS

This application claims the priority benefit of Taiwan application Serial No. 92105114, filed Mar. 10, 2003.

BACKGROUND OF INVENTION

1. Field of Invention

The present invention relates to a liquid crystal display panel. More particularly, the present invention relates to a liquid crystal display panel having an opposite positioned non-display area on each side of a display area.

2. Description of Related Art

In step with modern lifestyle of people, video and imaging devices are designed to occupy as little space as possible. Although the conventional cathode ray tube (CRT) has many advantages, bulkiness and radiation are two major factors that go against our demand for portability and safety. Consequently, flat panel displays including the liquid crystal displays, the organic light-emitting display and the plasma display panel have become the most important display devices.

In general, a liquid crystal display can be classified according to light source utilization into the reflective liquid crystal display (LCD) and the transflective liquid crystal display (LCD). The reflective or transflective LCD is primarily used in portable devices such as cellular phones and personal digital assistants. Because a reflective or transflective LCD can utilize the light coming from an external light source, the LCD has a high degree of clarity in an outdoor setting. Furthermore, through the utilization of external light, very little electric power is consumed. Hence, the reflective or transflective LCD is a particularly suitable display for a portable device such as the mobile phone or the personal digital assistant.

FIG. 1A is a top view showing the structural layout of a conventional liquid crystal display panel. FIG. 1B is a cross-sectional view of the conventional liquid crystal display panel in FIG. 1A. As shown in FIGS. 1A and 1B, the conventional liquid crystal display panel 100 comprises a first substrate 102, a second substrate 104, a liquid crystal layer 118 and a plurality of driver chips 106. The first substrate 102 has an array area 120 underneath the second substrate 104 and two non-display areas 108 on the adjacent sides of the array area 120. As shown in FIG. 1A, the non-display areas 108 is located on the right side and the bottom side of the first substrate 102. The liquid crystal layer 118 occupies the space bounded by the array area 120, the second substrate 104 and the sealing frame 110 surrounding the array area 120 between the first substrate 102 and the second substrate 104. The driver chips 106 are positioned on various driver chip bonding areas 112 inside the non-display area 108 for driving the liquid crystal layer 118 inside the array area 120. Furthermore, the non-display areas 108 also have a few flexible printed circuit film bonding areas 114 for connecting to various flexible printed circuit films 116 electrically.

However, the driver chips are positioned on the left side and the bottom side of the non-display areas of the liquid crystal display. This non-symmetrical setting often produces an awkward outward appearance, especially when the liquid crystal display is used in a cellular phone or a personal digital assistant.

FIG. 2A is a top view showing the structural layout of an alternative conventional liquid crystal display panel. FIG. 2B is a cross-sectional view of the conventional liquid crystal display panel in FIG. 2A. As shown in FIGS. 2A and 2B, the conventional liquid crystal display panel 200 is very similar to the liquid crystal display panel 100 in FIG. 1A. The conventional crystal display panel 200 also comprises a first substrate 202, a second substrate 204, a liquid crystal layer 218 and a plurality of driver chips 206. The first substrate 202 has an array area 220 and a non-display area 208. One major difference from the aforementioned liquid crystal display is that the non-display area 208 is located on one side of the array area 220. A plurality of driver chips 206 and a plurality of flexible printed circuit films 216 are similarly located inside the non-display area 208. At present, some of the mobile phones or personal digital assistants deploy this panel design to resolve the non-symmetrical problem.

However, when the panel design shown in FIG. 2A is applied to the fabrication of a high-resolution surface layer, the non-display area must provide sufficient area to accommodate all the driver chips. Hence, this type of panel design has definite limitations. In addition, the number of connecting circuits is also large for a high-resolution panel design. Therefore, it is impossible to design a fan-out circuit in the non-display area or else the driver chip bonding area is too large to match the size of a conventional driver chip.

SUMMARY OF INVENTION

Accordingly, one object of the present invention is to provide a liquid crystal display panel having driver chips opposite positioned in a non-display area on each side of a display area so that mobile phones or personal digital assistants can have a more symmetrical body after assembly.

A second object of this invention is to provide a liquid crystal display panel having a plurality of driver chips and a plurality of flexible printed circuit films opposite positioned on each side of a display panel. Thus, a circuit layout capable of accommodating all the fan-out wires can still be found and a small enough driver chip bonding area can still be designed to match the size of a conventional driver chip even when the liquid crystal display is a high-resolution device.

To achieve these and other advantages and in accordance with the purpose of the invention, as embodied and broadly described herein, the invention provides a liquid crystal display panel. The liquid crystal display panel comprises a first substrate, a second substrate, a liquid crystal layer and a plurality of driver chips. The first substrate has an array area and a pair of non-display areas opposite positioned on each side of the array area. The two non-display areas furthermore comprise a plurality of driver chip bonding areas for accommodating the driver chips. The second substrate is positioned over the array area. The liquid crystal layer is formed between the first substrate and the second substrate so that the array area of the first substrate, the second substrate and the liquid crystal layer between the two together form the display area of the liquid crystal display panel.

In this embodiment, the non-display areas furthermore have a plurality of flexible printed circuit film bonding areas for connecting electrically with a plurality of flexible printed circuit films.

In this embodiment, the first substrate is a substrate with an array of active device or an array of passive device. If the first substrate is an active device substrate, it is a thin film transistor array substrate. In addition, the second substrate that engages with the active device substrate or the passive device substrate can be a color-filter substrate so that the display is able to produce color.

In this embodiment, the driver chips can be gate driver chips or source driver chips for carrying out a scanning or a data transmission operation respectively.

In this invention, a more symmetrical design is used so that the driver chips and the flexible printed circuit films are set up within the non-display areas on each side of the display area. Therefore, the body of whatever devices using the design can be symmetrically designed and at the same time the fan-out requirement of the device can be satisfied.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a top view showing the structural layout of an alternative conventional liquid crystal display panel.

DETAILED DESCRIPTION

Figure 1A:
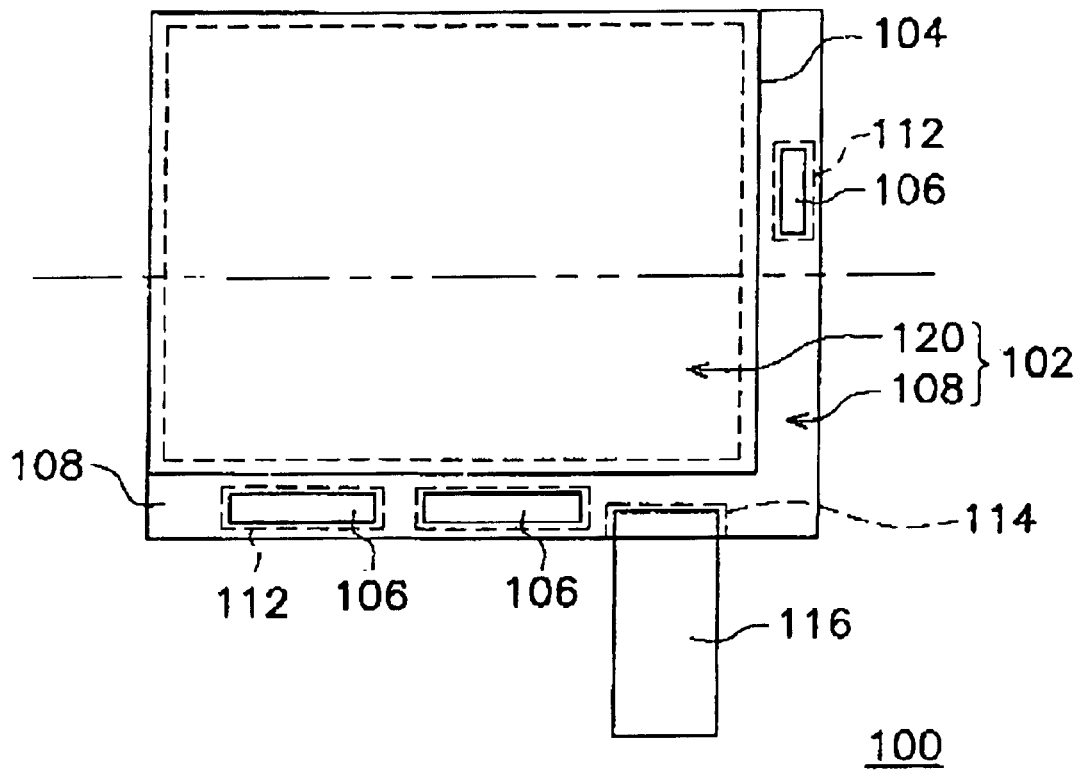
FIG. 1A is a top view showing the structural layout of a conventional liquid crystal display panel.
Figure 1B:
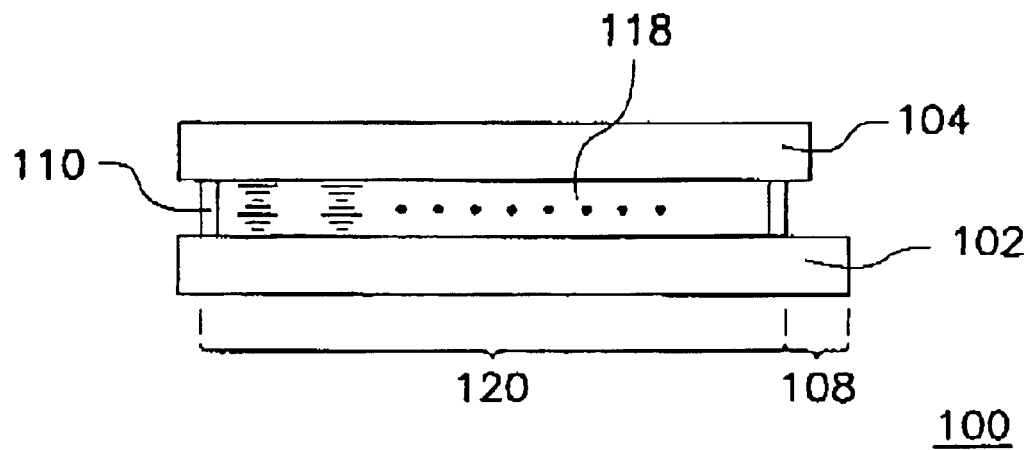
FIG. 1B is a cross-sectional view of the conventional liquid crystal display panel in FIG. 1A.
Figure 2B:
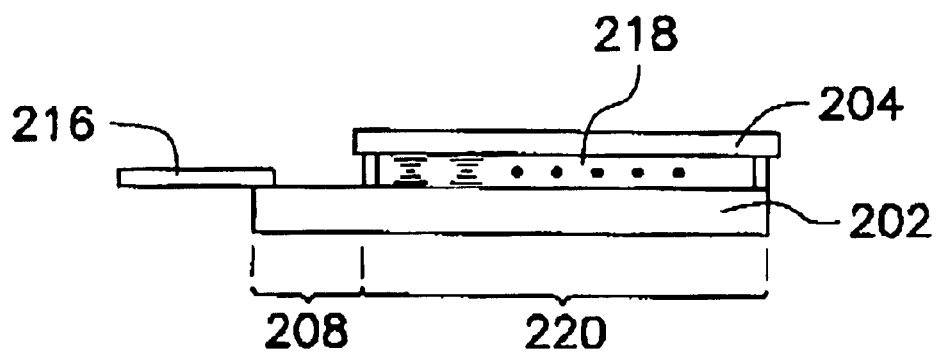
FIG. 2B is a cross-sectional view of the conventional liquid crystal display panel in FIG. 2A.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
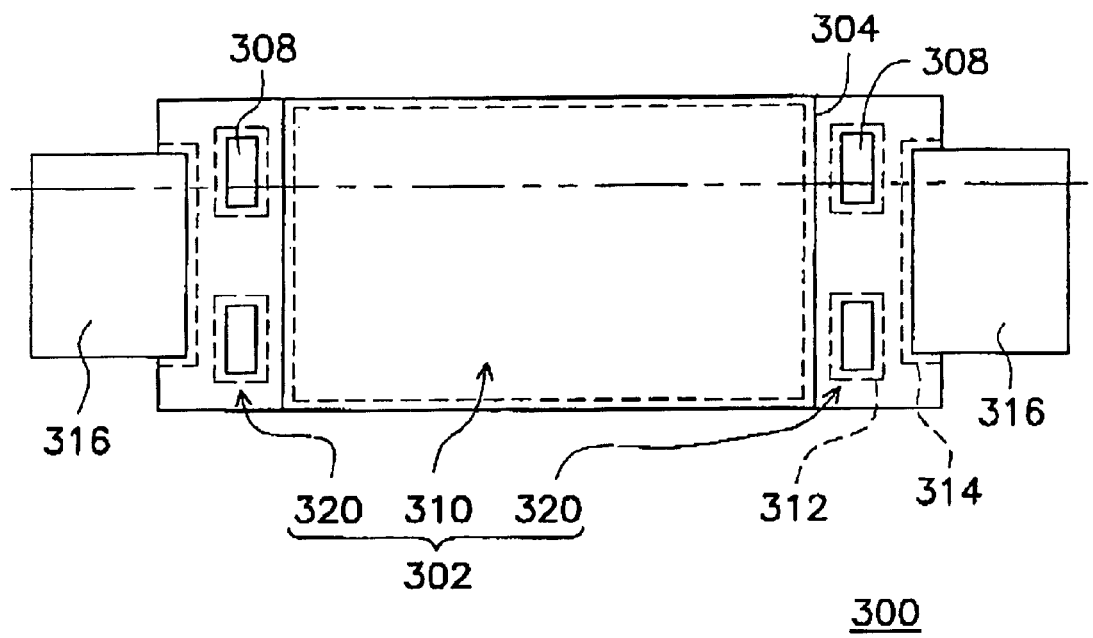
FIG. 3A is a top view showing the structural layout of a liquid crystal display panel according to one preferred embodiment of this invention.
Figure 3B:
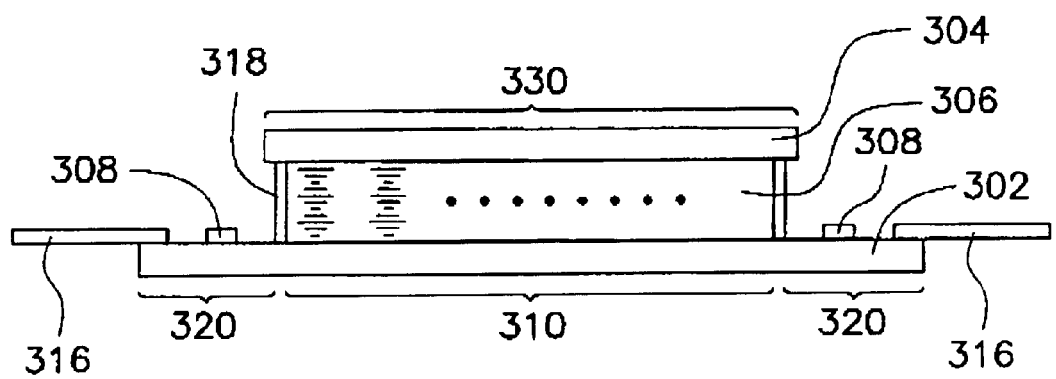
FIG. 3B is a cross-sectional view of the liquid crystal display panel in FIG. 3A.

FIG. 3A is a top view showing the structural layout of a liquid crystal display panel according to one preferred embodiment of this invention. FIG. 3B is a cross-sectional view of the liquid crystal display panel in FIG. 3A. As shown in FIGS. 3A and 3B, the liquid crystal display panel 300 comprises a first substrate 302, a second substrate 304, a liquid crystal layer 306 and a plurality of driver chips 308. The liquid crystal layer 306 is formed between the first substrate 302 and the second substrate 304 and driven by the driver chips 308. In this embodiment, the driver chips are gate driver chips or source driver chips for driving a scanning or a data transmission operation, for example.

The first substrate 302 has an array area 310 and a pair of non-display areas 320 opposite positioned on each side of the array area 310. Furthermore, a plurality of driver chip bonding areas 312 are formed within the non-display areas 320. The driver chips 308 are positioned over these driver chip bonding areas 312. In addition, a plurality of flexible printed circuit film bonding areas 314 next to the driver chip bonding areas 312 suitable for connecting with flexible printed circuit films 316 is also set up inside the non-display areas 320. In this embodiment, the first substrate 302 can be an active matrix array substrate or a passive matrix array substrate, for example. If the first substrate 302 is an active matrix array substrate, it is a thin film transistor array substrate. The second substrate 304 can be a color-filtering plate positioned over the array area 310, for example. The color-filter substrate filters the outgoing white light from a back light module (not shown) to produce light of various colors.

The aforementioned liquid crystal display panel 300 has a display area 330 and a pair of opposite positioned non-display areas on each side of the display area 330. The display area 330 actually comprises of the array area 310, the liquid crystal layer 306 and the second substrate 304. Moreover, the edges surrounding the array area 310 of the first substrate 302 and the second substrate 304 are adhered together and sealed to form an interior compartment through a sealant 318. Liquid crystal material is injected into the interior compartment to form the liquid crystal layer 306. Because the non-display areas are opposite positioned on each side of the display area 330, a larger area is provided for laying the driver chip bonding areas 312 and the flexible printed circuit film bonding areas 314. Hence, all driver chips 308 and flexible printed circuit films 316 necessary for operating the liquid crystal display panel 300 can be accommodated. In other words, despite having a high resolution, a proper circuit layout can still be designed without the driver chip bonding areas 312 occupying too large an area to cause a dimensional mismatch with common chips. Ultimately, aside from providing the high-density circuits necessary for operating a high-resolution panel, this panel design has an aesthetically appealing post-assembly symmetry.

Note the two opposite positioned non-display areas 320 can be positioned on the left and right side of the display area 330 or on the upper and lower side of the display area 330. Moreover, the driver chips 308 inside the non-display regions 316 can be pairwise identical or pairwise non-identical driver chips.

In the aforementioned embodiment, the driver chips and the flexible printed circuit films are positioned on two non-display areas opposite positioned on each side of the display area. However, this set up is not the only possible arrangement. The non-display areas can be set up in some other ways.

In conclusion, the liquid crystal display panel at least includes the following advantages: 1. By opposite positioned the two non-display areas on each side of the display area, mobile phones or personal digital assistants can have a more symmetrical outward appearance. 2. With the non-display areas arranged opposite relative to the display area, a larger non-display area is provided to increase substrate utilization and accommodate higher density circuits.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   a first substrate, wherein the first substrate has an array area and two non-display areas opposite positioned on two sides of the array area, and the non-display areas furthermore have a plurality of driver chip bonding areas therein, wherein the other two sides of the array area have no bonding areas thereon;

a second substrate formed over the array area;

a liquid crystal layer formed between the first substrate and the second substrate; and a plurality of driver chips formed on the driver chip bonding areas for driving the liquid crystal layer above the driver array area.

2. The liquid crystal display panel of claim 1, wherein the non-display areas furthermore comprise a plurality of flexible printed circuit film bonding areas for connecting electrically with flexible printed circuit films.

3. The liquid crystal display panel of claim 1, wherein the first substrate comprises an active matrix array substrate.

4. The liquid crystal display panel of claim 3, wherein the active matrix array substrate furthermore comprises a thin film transistor array substrate.

5. The liquid crystal display panel of claim 1, wherein the first substrate comprises a passive matrix array substrate.

6. The liquid crystal display panel of claim 1, wherein the second substrate comprises a color-filter substrate.

7. The liquid crystal display panel of claim 1, wherein the driver chips comprise gate driver chips and source driver chips.

* * * * *